United States Patent [19]
Seidel

[11] 3,723,913
[45] Mar. 27, 1973

[54] QUADRATURE HYBRID COUPLER USING ONE-PORT, LINEAR CIRCUIT ELEMENTS

[75] Inventor: Harold Seidel, Warren, N.J.

[73] Assignee: Bell Telephone Laboratories, Incorporated, Murray Hill, N.J.

[22] Filed: May 30, 1972

[21] Appl. No.: 257,874

[52] U.S. Cl. ....................................333/11, 333/25
[51] Int. Cl. ............................H01p 5/14, H03h 7/42
[58] Field of Search .......................333/10, 11, 24–26

[56] References Cited

UNITED STATES PATENTS 3,605,044 9/1971 Seidel....................................333/11
3,452,300 6/1969 Cappucci et al.......................333/10
3,452,301 6/1969 Cappucci et al.......................333/10

*Primary Examiner*—Herman Karl Saalbach
*Assistant Examiner*—Marvin Nussbaum
*Attorney*—R. J. Guenther et al.

[57] ABSTRACT

A new class of quadrature hybrid coupler is disclosed comprising a pair of baluns and a pair of symmetrical dual networks made up of simple, reactive elements. One conductor of each balun is connected in parallel with one of the networks and grounded at one end. The other network is connected between the other ends of the two other balun conductors. The four ends of the two other balun conductors constitute the four coupler ports. The two networks are fully defined to produce a quadrature coupler having an arbitrary power division character as a function of frequency.

13 Claims, 11 Drawing Figures

QUADRATURE HYBRID COUPLER USING ONE-PORT, LINEAR CIRCUIT ELEMENTS

This invention relates to quadrature hybrid couplers.

BACKGROUND OF THE INVENTION

In my copending application Ser. No. 234,782, filed Mar. 15, 1972, there is described a procedure for designing coupler networks which comprise a cascade of lumped-element quadrature couplers. For those unfamiliar with the properties of such quadrature couplers, networks of this type may not be regarded favorably. More important, however, even to the initiated, used to treating quadrature couplers as just another of the cononical circuit elements, parasitics associated with these couplers create complications in certain situations. Thus, while to a first approximation, these parasitics tend to be absorbed within the couplers, the higher order parasitics eventually destroy their bisymmetric, bidual characteristics. Since any attempt to minimize these higher order parasitics during the manufacturing process would be economically unfeasible, alternative means for obtaining coupler type networks which do not actually use quadrature hybrid couplers would be highly desirable.

It is, accordingly, the broad object of the present invention to synthesize bidual, bisymmetric hybrid couplers by means of one-port linear circuit elements.

It is a more specific object of the invention to synthesize, by means of one-port circuit elements, multipole hybrid couplers which have the same power division-frequency characteristics as do cascades of quadrature hybrid couplers.

It is a further object to synthesize hybrid couplers in such a manner that parasitic effects are fully absorbed within the coupler elements.

SUMMARY OF THE INVENTION

In accordance with the present invention, a multipole quadrature hybrid coupler is synthesized by means of two, mutually dual one-port reactive networks. This is a sufficient condition that the resulting coupler is a quadrature coupler. It also insures that parasitics associated with incidental terminal baluns can be fully absorbed within the structure of the networks.

A first embodiment of the invention comprises a pair of two-conductor baluns and a pair of mutually dual, multipole, one-port networks. One network, made up of shunt elements, is connected in parallel with one conductor of each balun, and grounded at one end. The other network is connected between adjacent ends of the other conductors of the two baluns. The four ends of the other two conductors also constitute the four ports of the coupler.

A second, symmetrical embodiment of the invention, utilizes four baluns.

Each of the dual networks comprises $n$ reactive elements, where $n$ is greater than one, and corresponds to the number of quadrature couplers used in the prior art coupler networks. As such, it is an advantage of the present invention that networks of quadrature couplers can be duplicated using only simple, one-port reactive elements.

It is a further advantage of the invention that the core inductance and first order parasitics associated with the terminal baluns, included to permit a ground connection at each port, are fully absorbed within the structure of the network such that the resulting coupler retains its nominal characteristics over an extended range of frequencies.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
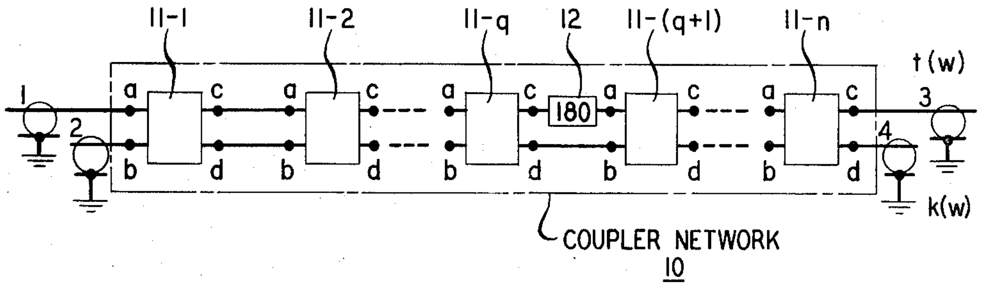
FIG. 1 (PRIOR ART)
FIG. 1 shows, in block diagram, a prior art coupler network comprising a cascade of quadrature hybrid couplers.

Referring to the drawings, FIG. 1 shows a block diagram of a prior art coupler network 10 comprising a cascade of quadrature hybrid couplers 11-1, 11-2 . . . 11-n. In the most general case, the couplers are divided into two subgroups, 11-1, 11-2 . . . 11-q and 11-(q+1) . . . 11-n, separated by a 180 degree phase shifter 12. It can be readily shown that such a network, and each of the subgroups of couplers, is itself a quadrature coupler. In my above-identified copending application, a procedure is described for designing the network, and the subgroups, to have any arbitrary power division characteristic as a function of frequency.

Figure 2:
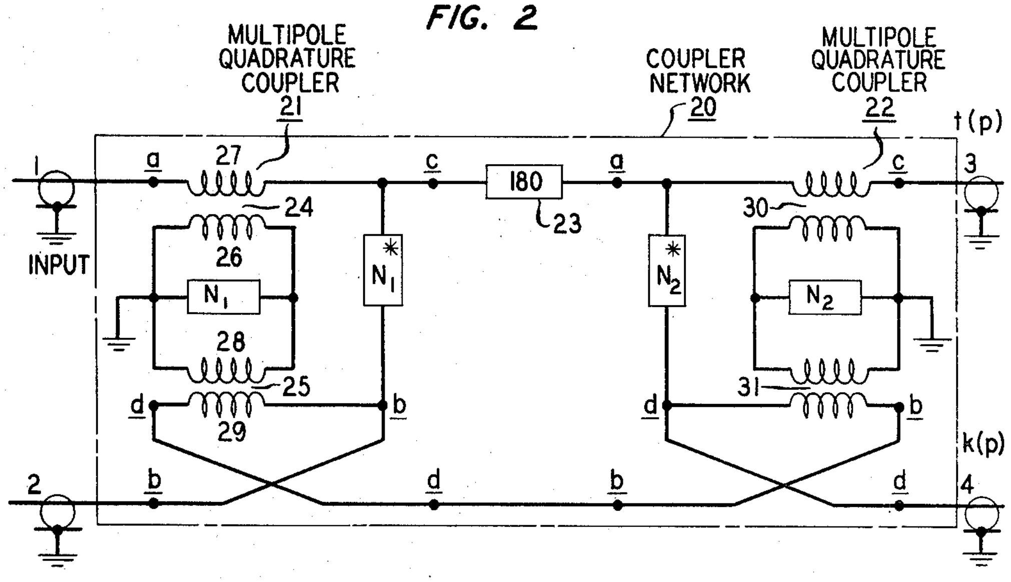
FIG. 2 shows a hybrid coupler network, in accordance with the present invention, having the same power division characteristic as the network shown in FIG. 1.

FIG. 2, now to be considered, shows a coupler network 20, employing two multipole quadrature couplers in accordance with the present invention, which, as will be shown hereinbelow, can be designed to have the same overall power division characteristic as prior art coupler network 10. In particular, network 20 comprises two, multipole quadrature couplers 21 and 22, separated by a 180 degree phase shifter 23. Coupler 21, which is the equivalent of the cascade of couplers 11-1, 11-2 . . . 11-q of FIG. 1, comprises two, two-conductor baluns 24 and 25, (such as lengths of transmission lines or 1:1 turns ratio transformers) and two, mutually dual networks $N_1$ and $N_1$*. In particular, network $N_1$ is connected in parallel with one conductor 26 of balun 24, and with one conductor 28 of balun 25. One end of the parallel connection is grounded. The second network $N_1$* is connected between the adjacent ends $c$ and $b$ of the other balun conductors 27 and 29. The ends *a*, *b*, *c* and *d* of conductors 27 and 29 are the four ports of the coupler. More particularly, ports *a* and *b* constitute one pair of conjugate ports, and ports *c* and *d* constitute the second pair of conjugate ports.

Coupler 22, which is the equivalent of quadrature couplers 11-(q+1) . . . 11-n of coupler network 10, similarly comprises a pair of baluns 30 and 31, and a pair of mutually dual networks $N_2$ and $N_2$* connected in the same manner as explained in connection with coupler 21.

Since couplers 21 and 22 are operated in the socalled "forward scattering mode," in which the two ports of one pair of conjugate ports of one coupler are connected, respectively, to the two ports of one pair of conjugate ports of the other coupler, port *c* of coupler 21 is connected by means of phase shifter 23 to port *a* of coupler 22, while conjugate port *d* of coupler 21 is connected to conjugate port *b* of coupler 22. Ports *a* and *b* of coupler 21 constitute one pair of conjugate ports 1 and 2 of the overall coupler network 20, and ports *c* and *d* constitute the second pair of conjugate ports 3 and 4 of coupler network 20.

In operation, each of the coupler network ports 1, 2, 3 and 4, is match-terminated by an impedance $Z_0$ given by $$Z_o = \sqrt{N_1 N_1^*} = \sqrt{N_2 N_2^*},$$

where $N_1$, $N_1$*, $N_2$ and $N_2$* are the impedances of the respective networks. Thus terminated, a unit input signal applied to port 1 produces output signals at ports 3 and 4 given by $t(p)$ and $k(p)$, where $t(p)$ is the network coefficient of transmission, $k(p)$ is the network coefficient of coupling, $p=i\omega$, and $i=\sqrt{-1}$.

That each of the individual couplers 21 and 22 does indeed have the power dividing properties of a hybrid coupler can be readily shown by an analysis which includes (a) decomposing the input signal into its symmetrical and antisymmetrical components, (b) determining the circuit response to each component, and (c) summing the results. To simplify this analysis, network $N_1$ is divided into two parallel networks $2N_1$, each having twice the impedance of network $N_1$, and network $N_1$* is divided into two series networks $N_1$*/2 each having half the impedance of network $N_1$*, as illustrated in FIGS. 3 and 4.

Figure 3:
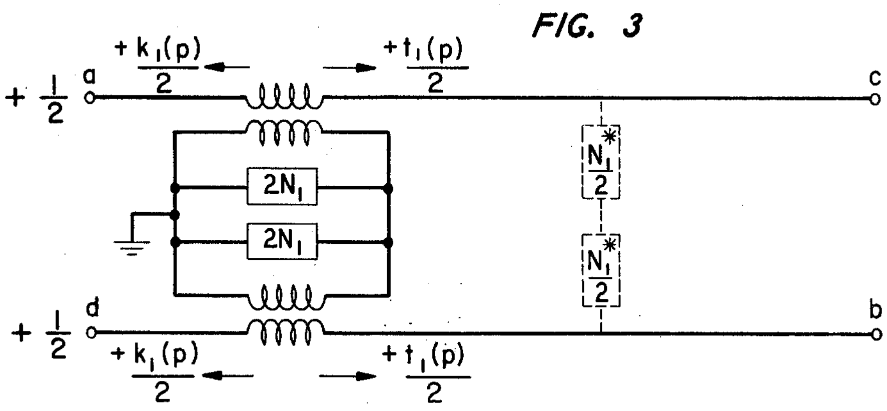
FIGS. 3 and 4 show a coupler, in accordance with the present invention, energized in the symmetric mode and in the antisymmetric mode, respectively.

When ports *a* and *d* are symmetrically energized by in-phase signals of magnitude ½, as in FIG. 3, there is no net voltage produced across the shunt-connected networks $N_1$*/2. Thus, in FIG. 3, the latter are shown in broken line. Each of the signal components sees only a series network $2N_1$ which causes a reflected signal component $k_1(p)/2$ to be produced at ports *a* and *d*, and a transmitted signal component $t_1(p)/2$ to be produced at ports *c* and *b*. Similarly, when ports *a* and *d* are antisymmetrically energized, as shown in FIG. 4, by means of out-of-phase signals +½ and −½, there is no net voltage produced across networks $2N_1$, shown in broken line, and only the two $N_1$*/2 networks are excited. Since each of the latter is the dual of networks $2N_1$, the reflected components at ports *a* and *d* are, respectively, $-k_1(p)/2$ and $+k_1(p)/2$, and the transmitted components at ports *c* and *b* are, respectively, $+t_1(p)/2$ and $-t_1(p)/2$.

Figure 4:
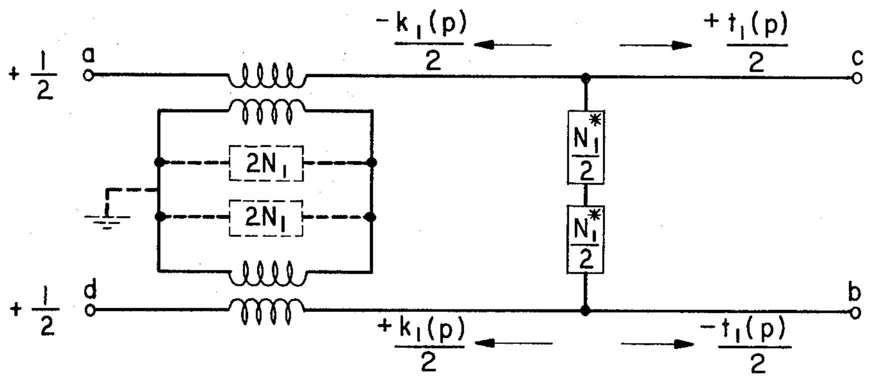

If, now, the symmetric and antisymmetric excitations are applied simultaneously, the net excitation and the resulting reflected and transmitted signals are obtained by simply adding the excitations and signal components shown in FIGS. 3 and 4. Thus, adding the excitation signals, we obtain unit excitation at port *a* and zero excitation at port *d*. The reflected signal components sum to zero at port *a* and to $k_1(p)$ at port *d*. The transmitted components sum to $t_1(p)$ at port *c* and to zero at port *b*. Accordingly, we find that a unit signal applied to port *a*, divides into two components $t_1(p)$ and $k_1(p)$ at ports *c* and *d*, respectively. No signal is coupled to port *b*. Thus, *a* and *b* are conjugate ports, and *c* and *d* are conjugate ports. Since the network is bilateral, the same net result is obtained by exciting any one of the coupler ports.

It will be noted that the coupler can be regarded as comprising two conductors wherein one end of each of the conductors and a first common junction, and the other ends of said conductors and a second common junction constitute the four coupler ports. One network is connected between the two conductors. A second network, dual to said first network, is connected between the common junctions. The two baluns, connected in series with two of the ports that share the same common junction, serve to permit one end of the external circuits connected to the four ports of the coupler to share a common ground connection.

A signal applied to any port, simultaneously excites the two conductors in both the antisymmetrical mode and the symmetrical mode. The former energizes the first of said networks. The second network, which is electrically balanced with respect to the two conductors for either mode of excitation, responds to the symmetrical mode of excitation.

Having established that the circuits 21 and 22 are, indeed, hybrid couplers, networks $N_1$ and $N_2$ and their duals are now more particularly defined such that couplers 21 and 22 are quadrature hybrid couplers, and that the overall responses of coupler networks 10 and 20 are identical.

In my above-identified copending application, the steps to be followed in the design of coupler network 10 are set forth and discussed. The relevant portions of that discussion, adapted to the present invention, will now be repeated.

STEPS

1. Identify the power division characteristic to be synthesized.

Figure 5:
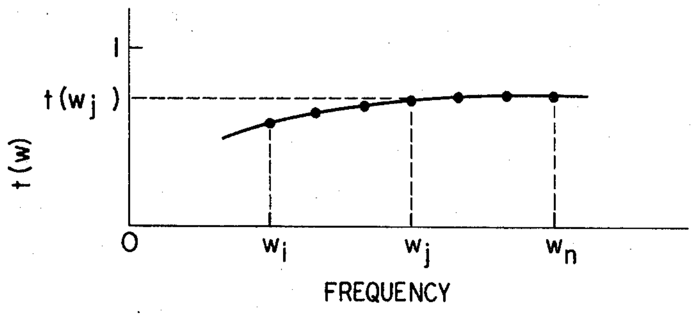
FIG. 5 shows any arbitrary variation of the coefficient of transmission $t(\omega)$ as a function of frequency.

Since the coefficient of coupling $k(\omega)$, and the coefficient of transmission $t(\omega)$ for a hybrid coupler are related by $$|t^2(\omega)| + |k^2(\omega)| = 1, \qquad (1)$$

a graphical representation of either $t(\omega)$ or $k(\omega)$ as a function of frequency fully defines the coupler. For purposes of illustration, the coefficient of transmission $t(\omega)$ having some arbitrary variation as a function of frequency is shown in FIG. 5.

2. Select any arbitrary number of points $(\omega_j, t(\omega_j))$ along the curve within the band of interest.

It is apparent that the greater the number of points selected, the more accurate will be the match. However, the greater the number of points, the more complex the resulting network. Accordingly, a compromise, based upon practical considerations of cost and accuracy, must be made.

3. For each $t(\omega_j)$, calculate $k(\omega_j)$, and form the ratio $$R = t(\omega_j)/ik(\omega_j)\,. \qquad (2)$$

For $n$, equal to the number of selected points, even:

$$iR = 1 + a_2(\omega_j)^2 + a_4(\omega_j)^4 \ldots a_n(\omega_j)^n/a_1(\omega_j) + a_3(\omega_j)^3 \ldots a_{n-1}(\omega_j)^{n-1}\,. \qquad (2a)$$

For $n$ odd:

$$iR = 1 + a_2(\omega_j)^2 + a_4(\omega_j)^4 \ldots a_{n-1}(\omega_j)^n/a_1(\omega_j) + a_3(\omega_j)^3 \ldots a_n(\omega_j)^{n-1}\,. \qquad (2b)$$

4. Determine the coefficients $a_1, a_2 \ldots a_n$, and solve for the roots of the equation $t(\omega_j) + k(\omega_j)$. For $n$ even or odd:

$$t(\omega_j) + k(\omega_j) \sim ia_n(a_j)^n + a_{n-1}(\omega_j)^{n-1} \ldots ia_1(\omega_j)^2 + ia_1(\omega_j) + ia_o = 0\,. \qquad (3)$$

If we define $p = i\omega$, the complex coefficients disappear, and we obtain the general expression $$a_np^n + a_{n-1}p^{n-1} \ldots a_2p^2 + a_1p + a_o = 0, \qquad (4)$$

where the coefficients $a_j$ are redefined to absorb any negative signs.

The roots obtained for $p$ will include both real roots and pairs of conjugate complex roots. In the prior art coupler network 10, each of the real roots is numerically equal to the crossover frequency of one of the couplers in the network. The complex roots define pairs of couplers whose crossover frequency can then be calculated. The manner of connecting these couplers is described in my above-identified application.

In addition, some of the roots have positive real parts while the others have negative real parts. The signs signify the groupings of the couplers on either side of the 180 degree phase shifter. Thus, referring to FIG. 1, couplers 11-1, 11-2 . . . 11-q would all be associated with roots whose real parts have one sign, (lie on one side of the complex plane), while couplers 11-(q+1) . . . 11-n would all be associated with roots whose real parts have the opposite sign, (lie on the other side of the complex plane).

The above-described steps would complete the design of the prior art coupler network 10. To design coupler network 20, in accordance with the present invention, the following additional steps are taken:

5. Having made the partition based upon the sign of the real part of the roots of equation (3), each group of roots is dealt with separately to synthesize each of the two couplers 21 and 22.

Designating one group of roots as $p_1, p_2 \ldots p_q$, form the polynomial $$(p-p_1)(p-p_2)\ldots(p-p_q) = 0\,, \qquad (5)$$

where $p = i\omega$. This equation is proportional to the sum of the coupling coefficient $k'(p)$ and the transmission coefficient $t'(p)$ of the multipole coupler 21. (i.e., see equation (3)).

6. Perform the indicated multiplication upon equation (5) and collect coefficients. The resulting equation is then given by $$b_q(p)^q + b_{q-1}(p)^{q-1} \ldots b_2(p)^2 + b_1(p) + b_o = 0\,. \qquad (6)$$

7. Form the ratio $t'(p)/k'(p)$ by placing all even power terms in the numerator, and all odd power terms in the denominator. Assuming $q$ is even, we obtain $$t'(p)/k'(p) = 1 + b_2(p)^2 \ldots b_q(p)^q/b_1(p) + b_3(p)^3 + b_{q-1}(p)^{q-1}.$$

Where $q$ is odd, we obtain (7)

$$t'(p)/k'(p) = 1 + b_2(p)^2 \ldots b_{q-1}(p)^{q-1}/b_1(p)^1 + b_3(p)^3 \ldots b_q(p)^q\,.$$

Figure 6:
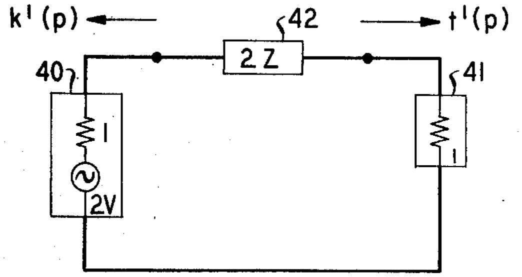
FIG. 6, included for purposes of explanation, shows a source connected to a matched load through a series impedance.

To obtain an understanding of the physical significance of equations (7), we consider, for the moment, the simple circuit shown in FIG. 6, comprising a 2 volt generator 40, having unit internal impedance, connected to a matching load 41, through a series impedance 42 of magnitude 2z. For this circuit, the reflected component of signal $k'(p)$ is given by $$k'(p) = 2z/2 + 2z\,, \qquad (8)$$

and the transmitted component of signal $t'(p)$ is given by $$t'(p) = 2/2 + 2z\,. \qquad (9)$$

The ratio $k'(p)/t'(p)$ is then $$t'(p)/k'(p) = 1/z\,. \qquad (10)$$

Thus, from equation (10) we note that the ratio of the coefficients is equal to an admittance function $1/z$. It will also be noted that the circuit of FIG. 6 is the same as the circuit shown in FIG. 3, which includes a network $2N_1$ in series between a source and a matched load. Thus, if impedance $z$ is realizable, coupler networks 21 and 22 would be realizable by synthesizing networks $N_1$ and $N_2$ and their duals in accordance with equations (7). In this connection, the prior partition of roots such that they all lie within one portion of the complex plane assures that the ratio $k'(p)/t'(p)$ is a positive real function. This is the first necessary condition that a $z$ function exists.

Figure 7:
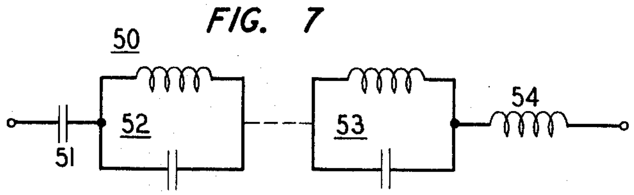
FIGS. 7 and 8 show a pair of mutually dual networks for use in connection with the present invention.

We further note that equations (7) are in the form of the driving point reactance function described by R. M. Foster in his article entitled "A Reactance Theorem," published in the April, 1924 issue of the *Bell System Technical Journal*. As noted in that article, the network defined by equations (7) is a driving point impedance, if, and only if, it is a positive real function. Since it has been established that this is so, such a network can be synthesized by the reactive circuit 50 shown in FIG. 7 comprising, in series, a capacitor 51 and one or more parallel L-C circuits 52, 53, and an inductor 54. In particular, the total number of reactive elements is equal to q, i.e., the number of roots in equation (5).

Figure 8:
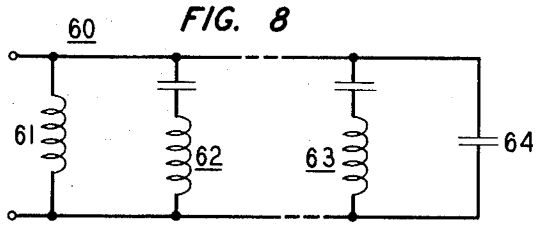

Alternatively, by reversing the sign of $k(p)$, and without changing the magnitude of the $t(p)$ to $k(p)$ ratio, equations (7) can define a driving point admittance, in which case they are synthesized by the reactive network 60 shown in FIG. 8 comprising, in shunt, an inductor 61, and one or more series L-C circuits 62, 63, and a capacitor 64. Here again, the total number of reactive elements is equal to the number of roots $q$. In addition, networks 50 and 60 are mutually dual networks. Thus, the synthesis of the network represented by equations (7), and the synthesis of its dual, define the networks $N_1$ and $N_1^*$ which make coupler 21 the exact equivalent of the cascade of couplers 11-1, 11-2 . . . 11-q. Similarly, the corresponding equations (7) for the coupler array 11-(q+1) . . . 11-n define the networks $N_2$ and $N_2^*$ which would make coupler 22 the exact equivalent of this second cascade of couplers.

Figure 9:
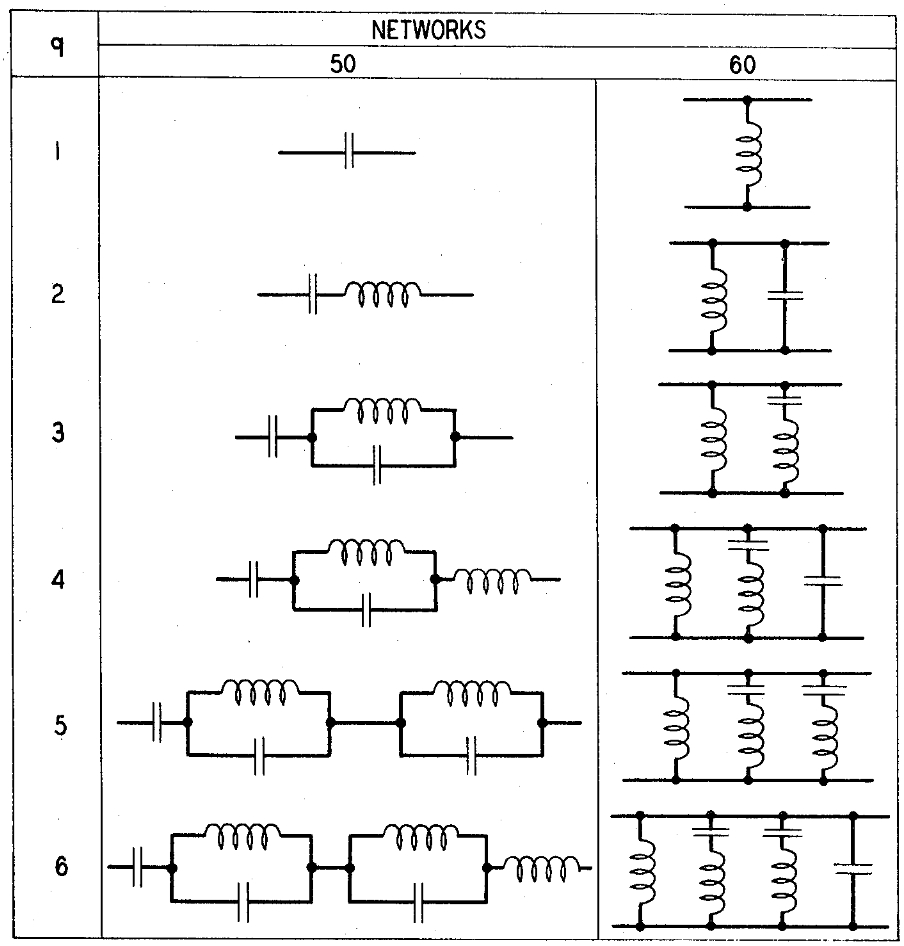
FIG. 9 shows, in tabular form, dual networks for use in connection with the present invention as a function of the number of roots in equation (5)

It should be noted that since networks $N_1$ and $N_1^*$ are dual, it makes no difference in the overall operation of coupler 21 which of the networks 50 and 60 is substituted for $N_1$. Thus, network 50 can be substituted for $N_1$ and network 60 for $N_1^*$. Conversely, network 60 can be substituted for $N_1$ and network 50 for $N_1^*$. In one practical embodiment, however, it is advantageous to have network $N_1$ (and, in coupler 22, network $N_2$) represented by network 60. This comes about by virtue of the manner in which network 60 is generated. To illustrate, in the simplest case, where $q = 1$, (i.e., the case where coupler 21 is the equivalent of only one coupler 11-1) network 60 is represented by shunt inductor 61, and network 50 by series capacitor 51. In the cases where $q$ is greater than one, networks 50 and 60 grow in the manner shown in FIG. 9, which tabulates these networks as a function of $q$.

Referring now to coupler 21, it will be noted that the core inductance associated with baluns 24 and 25 are in shunt with network $N_1$. It will also be noted from FIG. 9, that there is always a simple shunt inductive element associated with network 60. Since it is impossible to build to balun that has infinite core inductance, the presence of an inductor in network $N_1$ makes it possible to totally imbed this inductance in the network. Thus, knowing how much inductance is needed for network $N_1$, the baluns can be designated to provide some, or all of the necessary inductance. In this way, the baluns can be optimally designed, and their core inductances simply incorporated into network $N_1$. In the case where there are an even number of elements, the network will also include a simple parallel capacitor, thus permitting the absorption within network $N_1$ of any spurious capacitances associated with the baluns.

Similarly, for coupler 22, network $N_2$ would advantageously be represented by shunt network 60, and network $N_2^*$ by its dual network 50.

In the discussion thus far, transmission time through the baluns has not been considered. However, at the higher frequencies the baluns are advantageously a length of transmission line of finite length which, if ignored, can adversely affect the operation of the couplers. For example, a signal applied to port $a$ of coupler 21 will take a finite time $t$ to traverse balun 24, after which it will be impressed, simultaneously across both networks $N_1$ and $N_1^*$. If, however, network $N_1^*$ was connected at the other ends of the baluns (between ports $a$ and $d$) the applied signal would be impressed across network $N_1^*$ first, and across network $N_1$ at a time $t$ later. Thus, networks $N_1$ and $N_1^*$ are advantageously connected to the same ends of the baluns, as illustrated in FIG. 2.

Figure 10:
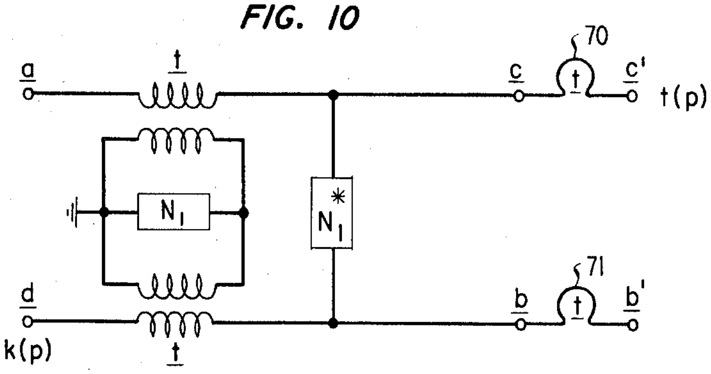
FIGS. 10 and 11 show couplers in accordance with the invention compensated for transit time effects.
Figure 11:
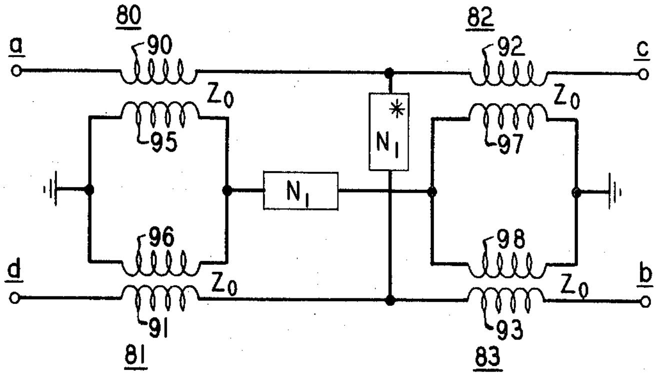

The second effect of transit time through the baluns is to modify the quadrature relationship between the two output signals. If, as above, a signal is applied to port $a$ of coupler 21, the transmitted component $t(p)$ at port $c$ experiences a delay $t$ through balun 24. The coupled component $k(p)$ at port $d$, on the other hand, experiences a first delay through balun 24 and an added delay $t$ through balun 25, for a total delay of $2t$. To equalize the delays, coupler 21 is modified as illustrated in FIG. 10, by the addition of sections of delay lines 70 and 71 in series with ports $c$ and $b$ to produce an added delay $t$ to the transmitted signal $t(p)$. However, to insure more complete symmetry, a second pair of transmission line baluns is advantageously employed instead of delay lines 70 and 71. Thus, a symmetric coupler, in accordance with the present invention, comprises four baluns 80, 81, 82 and 83 and network $N_1$ and $N_1^*$ connected as illustrated in FIG. 11. In this configuration, one conductor 90 of balun 80 is connected in series with one conductor 92 of balun 82, and one conductor 91 of balun 81 is connected in series with one conductor 93 of balun 83. Network $N_1^*$ is connected between the junction of conductors 90 and 92, and the junction of conductors 91 and 93. The other ends of conductors 90, 91, 92 and 93 constitute the four coupler ports $a$, $d$, $c$ and $b$, respectively. The other conductors 95 and 96 of baluns 90 and 91 are connected in parallel, as are the other conductors 97 and 98 of baluns 82 and 83. Network $N_1$ is connected between the adjacent ends of these two parallel circuits. Their other ends are grounded.

Since the baluns are lengths of transmission line in series with the source and loads connected to the coupler, they are designed to have a characteristic impedance $Z_o = \sqrt{N_1 N_1^*}$, where $N_1$ and $N_1^*$ are the impedances of the respective networks. It will also be noted that the core inductances of the four baluns comprise a network, equivalent to the core inductance of one of the baluns, in parallel with network $N_1$ and, hence, must be taken into consideration in the design of network $N_1$.

SUMMARY

A multipole quadrature hybrid coupler, having any arbitrary power division characteristic, has been synthesized by means of one-port, linear circuit elements. In one embodiment of the invention, a means for totally embedding stray parasitics within one of the coupler networks is described.

While a direct relationship is shown between a coupler in accordance with the present invention and prior art coupler networks comprising cascades of quadrature hybrid couplers, the former can be synthesized directly from equations (7). So long as the desired ratio of the coefficient of transmission to the coefficient of coupling can be expressed as a positive real function, it can be synthesized in accordance with Foster's teachings. Thus in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. A quadrature hybrid coupler comprising:

two conductors wherein one end of each of said two conductors and a first common junction, and the other ends of said conductors and a second common junction constitute the four ports of said coupler;

a first network connected between said two conductors;

and a second network, dual to said first network, connected between said common junctions;

said networks having multipole impedance characteristics.

2. The coupler according to claim 1 wherein a pair of baluns are connected in series with one pair of coupler ports that share the same common junction;

and wherein one end of the external circuits connected to said baluns and to said other pair of coupler ports, are connected to said second common junction.

3. The coupler according to claim 1 wherein a balun is connected in series with each of said four coupler ports.

4. The coupler according to claim 2 wherein the core impedances of said baluns are incorporated into said second network.

5. The coupler according to claim 3 wherein the core impedances of said baluns are incorporated into said second network.

6. A quadrature hybrid coupler including:

a pair of baluns, each comprising two conductors having a first end and a second end;

the first end of one conductor of each balun being connected to a first common junction, defining a ground connection;

the second ends of said one conductor being connected together forming a second common junction;

a first network being connected between said common junctions;

a second network, dual to said first network, being connected between the second ends of the other of said conductors;

and wherein the four ends of said other conductors constitute the four ports of said coupler.

7. The coupler according to claim 6 wherein each of said networks includes at least two reactive elements to form a multipole impedance characteristic.

8. The coupler according to claim 6 wherein said first network includes a shunt inductive element.

9. The coupler according to claim 8 wherein the parallel combination of the core inductances of said baluns constitutes at least a portion of the inductance of said shunt inductive element.

10. The coupler according to claim 6 wherein said first network includes a shunt capacitive element;

and wherein the parallel combination of the spurious capacitances of said baluns constitutes at least a portion of the capacitance of said shunt capacitive element.

11. The coupler according to claim 6 including a delay line, for compensating for the transit time through said baluns, connected in series with the second end of each of said other conductors.

12. A quadrature hybrid coupler including:

four baluns, each of which comprises two conductors having a first end and a second end;

the first end of one of the conductors of a first balun and of a second balun, and a first end of one of the conductors of a third balun and of a fourth balun being connected to a first common junction, defining a ground connection;

the second ends of said one conductor of said first and said second baluns being connected together forming a second common junction;

the second ends of said one conductor of said third and said fourth baluns being connected together forming a third common junction;

a first network connected between said second and third junctions;

the second ends of the other conductors of said first and third baluns being connected together;

the second ends of the other conductors of said second and fourth baluns being connected together;

a second network, dual to said first network, being connected between the second ends of the other conductors of said first and second baluns, and the second ends of the other conductors of said second and fourth baluns;

and wherein the four first ends of said four other conductors in conjunction with said common ground connection constitute the four ports of said coupler.

13. The coupler according to claim 12 wherein each balun comprises a length of transmission line of characteristic impedance $Z_0$ equal to $\sqrt{NN^*}$, where N and N* are the impedances, respectively, of said first and second networks.

* * * * *